United States Patent

Mauer et al.

(10) Patent No.: US 6,306,505 B1
(45) Date of Patent: *Oct. 23, 2001

(54) ACID ETCH RESISTANT FILM-FORMING COMPOSITIONS AND COMPOSITE COATING COMPOSITIONS

(75) Inventors: George W. Mauer, Brunswick Hills; Daniel D. Kish, Lorain; Melissa S. Rush-Batista, Avon, all of OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,592

(22) Filed: Aug. 18, 2000

Related U.S. Application Data

(63) Continuation of application No. 09/074,920, filed on May 8, 1998, now Pat. No. 6,136,443
(60) Provisional application No. 60/052,330, filed on Jul. 11, 1997.

(51) Int. Cl.$^7$ ................................................. B32B 27/38
(52) U.S. Cl. ................... 428/413; 428/418; 428/423.1; 428/423.2; 428/520; 428/522; 428/450; 525/459; 525/450
(58) Field of Search ................... 428/413, 418, 428/423.1, 423.3, 424.2, 520, 522, 450, 459; 525/450, 459

(56) References Cited

U.S. PATENT DOCUMENTS

| | | | |
|---|---|---|---|
| 3,256,225 | 6/1966 | Decatur, III | 260/23 |
| 3,544,505 | 12/1970 | Nagata et al. | 260/37 |
| 3,549,583 | 12/1970 | Nagata et al. | 260/37 |
| 3,719,619 | 3/1973 | Nagata et al. | 260/22 CB |
| 3,741,798 | 6/1973 | Dalibor | 117/132 B |
| 4,145,513 | 3/1979 | Dalibor | 528/75 |
| 4,163,739 | 8/1979 | Dalibor | 260/31.2 R |
| 4,163,836 | 8/1979 | Dalibor | 528/366 |
| 4,177,183 | 12/1979 | Dalibor | 260/31.4 R |
| 4,522,972 | 6/1985 | Mondt et al. | 524/548 |
| 4,818,796 | 4/1989 | Das et al. | 525/329.5 |
| 5,136,004 | 8/1992 | Bederke et al. | 526/273 |
| 5,187,199 | 2/1993 | Sudo | 523/523 |
| 6,136,443 | * 9/2000 | Mauer et al. | 428/413 |

FOREIGN PATENT DOCUMENTS

| | | |
|---|---|---|
| 0 071 070 | 2/1909 | (EP) . |
| 0 000 601 | 2/1979 | (EP) . |
| 0 000 608 | 2/1979 | (EP) . |
| 1 548 182 | 11/1968 | (FR) . |
| 1 549 059 | 7/1979 | (GB) . |
| WO 96/34924 | 11/1996 | (WO) . |

* cited by examiner

Primary Examiner—Paul Thibodeau
Assistant Examiner—D. Lawrence Tarazano
(74) Attorney, Agent, or Firm—William J. Uhl

(57) ABSTRACT

A curable film-forming composition which is resistant to acid etching is provided. The curable film-forming composition comprises:

A) a polymer prepared from the following ingredients:
1) an ethylenically unsaturated, beta-hydroxy ester functional monomer;
2) an ethylenically unsaturated, hydroxyalkyl functional monomer;
3) a vinyl aromatic compound; and
4) an alkyl ester of acrylic or methacrylic acid having 1 to 30 carbon atoms in the alkyl group; and B) an etherified aminoplast crosslinking agent. A multi-component composite coating composition is also provided, comprising a base coat deposited from a pigmented film-forming composition and a transparent top coat applied over the base coat in which the transparent coat, or clear coat, is deposited from the curable film-forming composition described above.

24 Claims, No Drawings

ACID ETCH RESISTANT FILM-FORMING COMPOSITIONS AND COMPOSITE COATING COMPOSITIONS

CROSS REFERENCE TO RELATED APPLICATION

This application is a continuation of Ser. No. 09/074,920 filed May 8, 1998, now U.S. Pat. No. 6,136,443, which is a continuation of provisional application No. 60/052,330 filed Jul. 11, 1997.

FIELD OF THE INVENTION

The present invention relates to aminoplast-curable film-forming (coating) compositions, and multi-component composite coating compositions comprising a pigmented or colored base coat and a transparent (clear) coat.

BACKGROUND OF THE INVENTION

Color-plus-clear coating systems involving the application of a colored or pigmented base coat to a substrate followed by the application of a transparent or clear topcoat to the base coat have become very popular as original finishes for automobiles. The color-plus-clear systems have outstanding gloss and distinctness of image. The clear coat is particularly important for these properties.

Coating compositions based on hydroxyl functional acrylic polymers and aminoplast crosslinking agents have been particularly desirable as automotive top coats because they exhibit excellent durability, hardness, gloss and appearance. Conventional coating systems that contain hydroxyl functional film-forming resins and aminoplast crosslinking agents rely on a cure mechanism wherein hydroxyl groups on the resin react with the aminoplast to form ether linkages. See, for example, European Patent Application 0 257 848. Historically, such coating systems have been vulnerable to acid attack and hence show poor acid etch resistance.

Because many geographic areas encounter acidic precipitation, acid resistance in coatings is becoming an increasingly desirable property, particularly for automotive coatings. When acidic rain water, also known as acid rain, accumulates on a horizontal section of an automobile such as a hood or trunk deck, it spots and can actually etch away the clear coat leaving a blemish that cannot be polished out. Hydroxyl-aminoplast coating systems of the prior art are not highly effective for providing protection against etching caused by acid rain.

Alternative curing systems can be used which provide improved acid etch resistance such as hydroxyl-isocyanate, epoxy-acid and carbamate-aminoplast; however, these systems are generally more costly than the hydroxyl-aminoplast coating systems, and in certain instances, lack some beneficial properties of hydroxy-aminoplast systems such as mar resistance or hardness.

It is an object of the present invention to provide a coating composition having improved acid etch resistance, utilizing inexpensive hydroxyl-aminoplast curing for use in a color-plus-clear composite coating system.

Surprisingly, it has been found that certain addition polymers derived from beta-hydroxy ester functional monomers can be cured with aminoplast crosslinking agents to yield acid etch resistant coatings.

SUMMARY OF THE INVENTION

In accordance with the present invention, a curable film-forming composition is provided which, when cured, yields a coating which is resistant to acid etching. The curable film-forming composition comprises:

A) a polymer having a weight average molecular weight of about 5000 to about 15,000 as determined by gel permeation chromatography using g a polystyrene standard, prepared from the following ingredients:
1) about 10 to about 70 percent by weight, based on the total solid weight of monomers used to prepare the polymer, of an ethylenically unsaturated, beta-hydroxy ester functional monomer of an ethylenically unsaturated acid functional monomer and an epoxy compound which is not polymerizable with the ethylenically unsaturated acid functional monomer;
2) about 5 to about 50 percent by weight, based on the total solid weight of monomers used to prepare the polymer, of an ethylenically unsaturated, hydroxyalkyl functional monomer;
3) about 15 to about 40 percent by weight, based on the total solid weight of monomers used to prepare the polymer, of a vinyl aromatic monomer; and
4) about 10 to about 60 percent by weight, based on the total solid weight of monomers used to prepare the polymer, of an alkyl ester of acrylic or methacrylic acid having 1 to 30 carbon atoms in the alkyl group; and B) an aminoplast crosslinking agent.

A multi-component composite coating composition is also provided by the present invention. The coating composition comprises a base coat deposited from a pigmented film-forming composition and a transparent top coat applied over the base coat in which the transparent coat, or clear coat, is deposited from the curable film-forming composition described above.

DETAILED DESCRIPTION

The polymer used in the film-forming composition of the present invention comprises the free radical initiated polymerization reaction product of:

1) about 10 to about 70 percent, preferably about 10 to about 40 percent by weight, based on the total solid weight of monomers used to prepare the polymer, of a polymerizable ethylenically unsaturated, acid functional monomer and an epoxy compound typically containing at least 5 carbon atoms which is not polymerizable with the ethylenically unsaturated acid functional monomer;
2) about 5 to about 50 percent, preferably about 20 to about 40 percent by weight, based on the total solid weight of monomers used to prepare the polymer, of a polymerizable ethylenically unsaturated, hydroxyalkyl functional monomer, typically having from 2 to 4 carbon atoms in the hydroxyalkyl group;
3) about 15 to about 40 percent, preferably about 30 to about 40 percent by weight, based on the total solid weight of monomers used to prepare the polymer, of a vinyl aromatic monomer; and
4) about 10 to about 60 percent, preferably about 10 to about 20 percent by weight, based on the total solid weight of monomers used to prepare the polymer, of an alkyl typically an aliphatic alkyl or aryl ester of acrylic or methacrylic acid having 1 to 30, preferably 4 to 30, carbon atoms in the alkyl group and 6 to 30 carbon atoms in the aryl group. Polymerization is conducted in the presence of a free radical initiator.

Examples of ethylenically unsaturated acid functional monomers include monocarboxylic acids such as acrylic acid, methacrylic acid, and crotonic acid; dicarboxylic acids such as itaconic acid, maleic acid, and fumaric acid; and monoesters of dicarboxylic acids such as monobutyl maleate and monobutyl itaconate. Acrylic acid and methacrylic acid are preferred.

The epoxy compound does not contain ethylenic unsaturation which would participate in free radical initiated polymerization with the unsaturated acid monomer. Examples of such epoxy compounds are glycidyl esters and ethers, preferably those containing from 8 to 30 carbon atoms. Examples of glycidyl ethers are glycidyl ethers of alcohols and phenols such as butyl glycidyl ether, octyl glycidyl ether, phenyl glycidyl ether and para-(tertiary-butyl) phenyl glycidyl ether.

Examples of glycidyl esters are those of the structure:

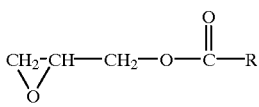

wherein R is a hydrocarbon radical containing from about 4 to about 26 carbon atoms. Preferably, R is a branched hydrocarbon radical, more preferably a tertiary aliphatic group of about 8 to about 10 carbon atoms such as neopentanoate, neoheptanoate, and neodecanoate. Glycidyl esters of commercially available mixtures of tertiary aliphatic carboxylic acids such as those available from Shell Chemical Company as VERSATIC ACID 911 are particularly preferred. The glycidyl esters themselves are also commercially available from Shell Chemical Company as CARDURA E; and from Exxon Chemical Company as GLYDEXX-10. Examples of other epoxy compounds are 1,2-pentene oxide and styrene oxide.

The ethylenically unsaturated acid functional monomer and epoxy compound are typically in an equivalent ratio (acid to epoxy) of about 1:1. Higher or lower ratios can be used as desired.

The beta-hydroxy ester functional monomer may be prepared in several ways, for example (1) the ethylenically unsaturated acid functional monomer and epoxy compound can be pre-esterified prior to polymerization and the resultant reaction product addition polymerized by free radical initiated polymerization techniques; (2) the unsaturated acid functional monomer can be addition polymerized by free radical initiated polymerization techniques, typically along with one or more hydroxyalkyl functional monomers and one or more other additional ethylenically unsaturated monomers, in the presence of the epoxy compound under conditions which promote the carboxyl/epoxy esterification reaction; and (3) the unsaturated acid functional monomer can be addition polymerized by free radical initiated polymerization techniques, typically along with one or more hydroxyalkyl functional monomers and one or more other additional ethylenically unsaturated monomers, to form a polymeric product having acid functionality, which polymeric product can be subsequently esterified by reaction with the epoxy compound.

The polymerization and esterification reactions are generally conducted at from about 80° C. to about 170° C., preferably from about 120° C. to about 145° C. For pre-esterification of the epoxy compound and unsaturated acid functional monomer followed by reaction of the resulting adduct with other ethylenically unsaturated monomers, it may be desirable to avoid temperatures in excess of about 120° C. so as to minimize or avoid premature polymerization of the unsaturated acid functional monomer. Moreover, when pre-esterification is conducted, it is usually done in the presence of a catalyst for promoting the epoxy/acid reaction such as tertiary amine, phosphine, or tin catalyst. Also for pre-esterification, a free radical inhibitor may be used to inhibit polymerization.

It is preferred to conduct the polymerization and esterification reactions simultaneously since this involves one step instead of two. In conducting simultaneous esterification and polymerization, the temperature should be high enough to ensure that the polymerization and esterification are occurring at about the same rate. Where desired, an esterification catalyst such as those mentioned above may be utilized. However, such a catalyst is not necessary if the reaction temperature is high enough; for example, greater than about 130° C. In conducting the reaction, the reactive ingredients are heated, typically in the presence of a free radical initiator and optionally a chain transfer agent, in an organic solvent in which the ingredients as well as the resultant polymer product are compatible. Typically, the epoxy compound along with organic solvent is charged to a reaction vessel and heated to reflux, optionally under an inert atmosphere. The ethylenically unsaturated acid functional monomer and other monomers and free radical initiator are added slowly to the refluxing reaction mixture. After the addition is complete, some additional initiator may be added and the reaction mixture held at an elevated temperature to complete the reaction.

Suitable ethylenically unsaturated hydroxyalkyl functional monomers used to prepare the polymer in the film-forming composition of the present invention include hydroxyalkyl functional acrylates and methacrylates such as hydroxyethyl acrylate, hydroxyethyl methacrylate, hydroxypropyl acrylate, hydroxypropyl methacrylate, 4-hydroxybutyl acrylate, 4-hydroxybutyl methacrylate and the like. Mixtures of these hydroxyalkyl functional monomers may also be used.

Suitable vinyl aromatic compounds include styrene which is preferred, alpha-methylstyrene, alpha-chloromethyl styrene and vinyl toluene.

Suitable alkyl esters of acrylic and methacrylic acid or anhydride, wherein the alkyl portion of the ester contains from about 1 to about 30, preferably 4 to 30, carbon atoms, are those in which the alkyl group is linear or branched, aliphatic including cycloaliphatic. Suitable monomers include alkyl acrylates such as methyl acrylate, n-butyl acrylate and t-butyl acrylate, 2-ethylhexyl acrylate, isobornyl acrylate, cyclohexyl acrylate, t-butyl cyclohexyl acrylate, trimethyl cyclohexyl acrylate, lauryl acrylate, and the like; alkyl methacrylates, including methyl methacrylate, n-butyl methacrylate, t-butyl methacrylate, 2-ethylhexyl methacrylate (which is preferred), isobornyl methacrylate, cyclohexyl methacrylate, t-butyl cyclohexyl methacrylate, trimethyl cyclohexyl methacrylate, and lauryl methacrylate. Suitable aryl esters include acrylate and methacrylate esters secondary and tertiary butylphenol substituted in the 2,3 or 4 position and nonylphenol.

Preferably, both styrene and 2-ethylhexyl methacrylate are used together. In this preferred embodiment, styrene is used in an amount of about 30 to about 40 percent by weight, based on the total weight of resin solids in the film-forming composition, and 2-ethylhexyl methacrylate in an amount of about 10 to about 20 percent by weight, based on the total weight of resin solids in the film-forming composition. Such a combination optimizes acid etch resistance and crack resistance of the cured coating.

In a separate embodiment of the invention, the polymer may be partially carbamoylated, i.e., have pendant carbamate functional groups. Such groups may be incorporated into the polymer in several ways. Carbamate functional groups may be incorporated into the polymer by copolymerizing the acrylic monomers with a carbamate functional vinyl monomer, for example a carbamate functional alkyl ester of methacrylic acid. These carbamate functional alkyl esters are prepared by reacting, for example, a hydroxyalkyl carbamate with methacrylic anhydride. Other carbamate functional vinyl monomers are, for instance, the reaction product of a hydroxyalkyl (meth)acrylate such as hydroxyethyl methacrylate, a diisocyanate such as isophorone diisocyanate, and a carbamate functional alcohol such as hydroxypropyl carbamate. Such monomers are disclosed in U.S. Pat. No. 5,098,947. Still other carbamate functional vinyl monomers may be used, such as the reaction product of isocyanic acid (HNCO) with a hydroxyl functional acrylic or methacrylic monomer such as hydroxyethyl acrylate. Carbamate groups can also be incorporated into the acrylic polymer by reacting a hydroxyl functional acrylic polymer with a low molecular weight carbamate functional material via a "transcarbamoylation" reaction. Such a reaction may be performed at about 130 to about 170° C., and at pressures up to ambient pressure. In this reaction, a low molecular weight carbamate functional material derived from an alcohol or glycol ether is reacted with the hydroxyl groups of the acrylic polymer, yielding a carbamate functional acrylic polymer and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Examples of organic solvents which may be used in the polymerization reaction include aromatic hydrocarbons such as xylene, toluene, and naphtha; ketones such as methyl ethyl ketone, methyl amyl ketone, methyl n-butyl ketone, and methyl isobutyl ketone; esters such as butyl acetate, hexyl acetate, and heptyl acetate; glycol ethers and glycol esters such as ethylene glycol monoethyl ether, ethylene glycol monobutyl ether, propylene glycol monomethyl ether, propylene glycol monoethyl ether, dipropylene glycol monoethyl ether, propylene glycol monoethyl ether acetate, and isobutyl isobutyrate. Alcohols such as lower alkanols and simple glycols may also be used, but are not preferred.

Suitable free radical initiators are those which are soluble in the polymerization medium, including azo compounds such as alpha,alpha'-azobis-(isobutyronitrile), azobis-(alpha, gamma-dimethyl valeronitrile), and 2,2'-azobis (methylbutyronitrile); peroxides such as benzoyl peroxide, ditertiarybutyl peroxide, and cumene hydroperoxide; tertiary butyl peracetate; isopropyl percarbonate; butyl isopropyl peroxy carbonate; and similar compounds. The quantity of initiator may vary considerably depending on the type, but usually is between about 0.5 and about 7 percent by weight based on the total solid weight of monomers used to prepare the polymer.

The polymer used in the film-forming composition of the present invention typically has a weight average molecular weight of about 5000 to about 25,000, preferably about 7000 to about 15,000 as determined by gel permeation chromatography using a polystyrene standard. Molecular weights less than 5000 are less desirable because acid etch resistance of the cured coating may be compromised; whereas molecular weights greater than 25,000 are less desirable because higher molecular weights contribute to higher viscosities, making the film-forming composition difficult to spray at ambient conditions while maintaining good appearance and acceptable solvent levels. The hydroxyl equivalent weight of the polymer is generally about 300 to about 800, preferably about 300 to about 500.

The polymer used in the film-forming composition of the present invention preferably has a glass transition temperature ($T_g$) of at least about 10, more preferably at least about 20 and most preferably at least about 30° C. $T_g$'s less than 10 are less desirable because acid etch resistance of the cured coating may be compromised, The $T_g$ is described in PRINCIPLES OF POLYMER CHEMISTRY, Flory, Cornell University Press, Ithaca, N.Y., 1953, pages 52–57. The $T_g$ can be calculated as described by Fox in Bull. Amer. Physic. Society, 1,3, page 123 (1956). The $T_g$ can be measured experimentally by using a penetrometer such as a Du Pont 940 Thermomedian Analyzer. The $T_g$ of the polymers as used herein refers to the calculated values unless otherwise indicated.

The polymer is present in the film-forming composition in amounts of about 55 to about 85, preferably about 65 to about 75 percent by weight based on the total weight of resin solids in the film-forming composition. Levels that are too high (i. e., above about 85%) can lead to insufficient cure, while levels that are too low (i. e., below about 55%) can cause reduced acid etch resistance.

Film-forming compositions of the present invention further comprise an aminoplast crosslinking agent containing methylol ether groups. Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains imino and methylol groups and preferably at least a portion of the methylol groups are etherified with an alcohol to modify the cure response. Any monohydric alcohol may be employed for this purpose including methanol, ethanol, n-butyl alcohol, isobutanol, and hexanol, with methanol, n-butyl alcohol and isobutanol being preferred.

Preferably, the aminoplasts which are used are melamine-, urea-, or benzoguanamine-formaldehyde condensates, preferably monomeric and at least partially etherified with one or more alcohols containing from one to four carbon atoms. Most preferably, the methylol groups are fully etherified with at least one alcohol selected from the group consisting of methanol, n-butanol, and isobutanol.

A preferred aminoplast is available from Monsanto Chemical Company as RESIMENE 751, a highly monomeric fully alkylated melamine etherified with both methanol and n-butanol. Alternatively, the aminoplast is preferably at least partially etherified with isobutanol. A particularly preferred aminoplast is available from CYTEC Industries as CYMEL 1161. Such aminoplast provides optimal acid etch resistance.

The aminoplast is present in the film-forming composition in amounts of about 15 to about 45, preferably about 15 to about 35 percent by weight based on the total weight of resin solids in the film-forming composition.

The film-forming composition of the present invention may also contain adjuvant curing agents such as a capped polyisocyanate. The polyisocyanate can be an aliphatic or an aromatic polyisocyanate or a mixture of the two. Diisocyanates may be used, although higher polyisocyanates such as isocyanurates of diisocyanates are preferred. Higher polyisocyanates can also be used in combination with diisocyanates. Isocyanate prepolymers, for example, reaction products of polyisocyanates with polyols can also be used.

If the polyisocyanate is capped, any suitable aliphatic, cycloaliphatic, or aromatic alkyl monoalcohol known to those skilled in the art may be used as a capping agent for the polyisocyanate. Other suitable capping agents include oximes and lactams.

Other adjuvant curing agents include triazines such as tricarbamoyl triazine compounds having the formula $C_3N_3(NHCOXR)_3$, wherein X is nitrogen, oxygen, sulfur, phosphorus, or carbon, and R is a lower alkyl group having one to twelve carbon atoms, or mixtures of lower alkyl groups. Such compounds and the preparation thereof are described in detail in U.S. Pat. No. 5,084,541.

When used, the adjuvant crosslinking agent is present in the film-forming composition in an amount ranging up to about 20, preferably of about 1 to 20, percent by weight based on the total weight of resin solids in the film-forming composition.

Usually the film-forming composition will also preferably contain catalysts to accelerate the cure of the aminoplast with reactive groups on the polymer. Examples of suitable catalysts are acidic materials and include acid phosphates and sulfonic acid or a substituted sulfonic acid such as dodecylbenzene sulfonic acid or paratoluene sulfonic acid. The catalyst is usually present in an amount of about 0.5 to about 5.0 percent by weight, preferably about 0.5 to about 1.5 percent by weight, based on the total weight of resin solids. Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to about 40% by weight based on the total weight of resin solids.

The film-forming composition of the present invention may be solventborne or waterborne; preferably it is solventborne. Suitable solvent carriers include the various alcohols, esters, ethers, aromatic solvents, and other solvents, including mixtures thereof, that are known in the art of coating formulation. The film-forming composition typically has a total solids content of about 40 to about 60 percent by weight.

The film-forming composition of the present invention may contain color pigments conventionally used in surface coatings and may be used as a high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

The film-forming composition of the present invention is preferably used as the clear coat layer in a multi-component composite coating composition such as a "color-plus-clear" coating system, which includes at least one pigmented or colored base coat and at least one clear topcoat. The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The base coat compositions may be solventborne or waterborne. Waterborne base coats in color-plus-clear compositions are disclosed in U.S. Pat. No. 4,403,003, and the resinous compositions used in preparing these base coats can be used in the practice of this invention. Also, waterborne polyurethanes such as those prepared in accordance with U.S. Pat. No. 4,147,679 can be used as the resinous binder in the base coat. Further, waterborne coatings such as those described in U.S. Pat. No. 5,071,904 can be used as the base coat. Suitable solventborne coatings include any known to those skilled in the art. Examples include DCT-6373, a solventborne base coat commercially available from PPG Industries, Inc.

As mentioned above, the base coat composition contains pigments. Color pigments conventionally used in surface coatings are suitable and include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

In general, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to about 40 percent by weight of the total weight of the coating composition.

The base coating compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the base coat composition to the substrate, a film of the base coat is formed on the substrate. Typically, the base coat thickness will be about 0.01 to about 5 mils (about 0.254 to about 127 microns), preferably about 0.1 to about 2 mils (about 2.54 to about 50.8 microns) in thickness.

After application of the base coat to the substrate, a film is formed on the surface of the substrate by driving solvent, i. e., organic solvent and/or water, out of the base coat film by heating or by an air drying period. Preferably, the heating will only be for a short period of time, sufficient to ensure that the clear coat can be applied to the base coat without dissolving the base coat composition. Suitable drying conditions will depend on the particular base coat composition, and on the ambient humidity with certain waterborne compositions, but in general a drying time of from about 1 to 5 minutes at a temperature of about 80–250° F. (20–121° C.) will be adequate to ensure that mixing of the two costs is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to 20 minutes.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from 160– 350° F. (71–177° C.) but if needed, lower or higher temperatures may be used as necessary to activate crosslinking mechanisms. The thickness of the clear coat is usually from about 0.5 to about 5 mils (about 12.7 to about 127 microns), preferably about 1.2 to about 3 mils (about 30.5 to about 76.2 microns). The resultant crosslinked coating exhibits a high level of acid etch resistance. By "high level" it is meant that the resistance of the coating composition to etching by acid rain is significantly improved compared to conventional high solids hydroxyl-aminoplast cured coating compositions.

The invention will further be described by reference to the following examples. Unless otherwise indicated, all parts are by weight.

Examples A through F illustrate the preparation of polymeric acrylic polyols.

EXAMPLE A

This example illustrates the preparation of an acrylic polyol containing hydroxyl groups derived from hydroxyethyl methacrylate and an adduct of acrylic acid and glycidyl neodecanoate.

A reaction vessel equipped with stirrer, thermocouple, condenser and addition funnels with pumps was charged with 720.5 g n-butyl acetate, 131.0 g xylene and 421.2 g glycidyl neodecanoate and heated to reflux (about 135° C.). Two feeds, identified herein as Feed A and Feed B, were gradually and simultaneously added to the vessel over a period of 3 hours while the contents of the vessel were maintained at reflux conditions. Feed A consisted of a mixture of 672.0 g styrene, 484.8 g hydroxyethyl methacrylate, 320.0 g methyl methacrylate and 123.2 g acrylic acid. Feed B consisted of a mixture of 80.0 g t-amyl peroxy-2-ethyl hexanoate (LUPEROX 575 available from Elf-Atochem) and 262.0 g 2-ethoxyethyl propionate. After the addition of the two feeds A and B was complete, a mixture of 3.2 g LUPEROX 575 and 13.1 g xylene was added and the reaction contents stirred for one hour. After this time another addition consisting of 3.2 g LUPEROX 575 and 13.1 g xylene was made. The reaction contents were stirred for an additional hour and cooled while adding 170.3 g n-butyl acetate.

The resultant product had a total solids content of 60.3% measured for 1 hour at 110° C.; a viscosity of 33.3 stokes; had an acid value of 7.51 mg KOH/g; a hydroxyl value of 94.1 mg KOH/g; had an APHA color of 15–20; and a weight average molecular weight of 11,200 and a $T_g$ of 50° C.

EXAMPLE B

An acrylic polyol was prepared as in Example A, except that methyl methacrylate was replaced with lauryl methacrylate. The weight average molecular weight was 11,705 and the $T_g$ was 17° C.

EXAMPLE C

Comparative

This example illustrates the preparation of an acrylic polyol with hydroxyl groups derived from hydroxypropyl acrylate.

A reaction vessel equipped with stirrer, thermocouple, condenser and addition funnels with pumps was charged with 792.6 g n-butyl acetate and 144.1 g xylene and heated to reflux (about 126° C.). Two feeds, identified herein as Feed A and Feed B, were combined and gradually added to the vessel over a period of three hours while the contents of the vessel were maintained at reflux conditions. Feed A consisted of a mixture of 738.1 g styrene, 773.7 g hydroxypropyl acrylate, 551.4 g methyl methacrylate, 155.6 g butyl methacrylate, 4.4 g acrylic acid. Feed B consisted of a mixture of 88.0 g LUPEROX 575 and 288.2 g 2-ethoxyethyl propionate. After the addition of the two feeds A and B was complete, a feed consisting of 3.5 g LUPEROX 575 and 14.4 g xylene was added and the reaction contents stirred for one hour. After this time another addition consisting of 3.5 g LUPEROX 575 and 14.4 g xylene was made. When the addition was complete, the reaction contents were stirred for an additional hour and cooled while adding 187.3 n-butyl acetate.

The resultant product had a total solids content of 60.6% measured for 1 hour at 110° C.; a Gardner-Holdt bubble tube viscosity X-Y; and acid of 2.18 mg KOH/g; a hydroxyl value of 89.6 mg KOH/g; an APHA color of 5–10; and a weight average molecular weight of 12,464 and a $T_g$ of 57° C.

EXAMPLE D

An acrylic polyol was prepared as in Example A, except that hydroxyethyl methacrylate was replaced with hydroxybutyl acrylate. The weight average molecular weight was 13,908 and the $T_g$ was 23° C.

EXAMPLE E

An acrylic polyol was prepared as in Example A, except that styrene was replaced with methylstyrene. The weight average molecular weight was 7234 and the $T_g$ was 62° C.

EXAMPLE F

Comparative

An acrylic polyol was prepared as in Example A, except that styrene was replaced with methyl methacrylate. The weight average molecular weight was 13,077 and the Tg was 49° C.

Examples 1–9

Examples 1–9 illustrate the preparation of clear film-forming compositions using the polymeric acrylic polyols of Examples A through F. Examples 1–3, 5, and 7 are illustrative of the present invention. Examples 4, 6, 8 and 9 are comparative. The clear coat of Example 4 contains acrylic polyol in an amount less than that of the present invention. The clear coat of Example 6 does not contain an acrylic polyol derived from a reaction product of an ethylenically unsaturated acid functional monomer and an epoxy compound containing at least 5 carbon atoms. Example 6 illustrates a conventional polyol-aminoplast film-forming composition. The clear coats of Examples 8 and 9 contain acrylic polyols that do not contain styrene.

The ingredients for each composition were mixed together in the order listed:

TABLE 1

| | Total (grams) |
|---|---|
| SOLVESSO 100[1] | 39 |
| DME dibasic ester[2] | 4.4 |
| TINUVIN 328[3] | 6.7 |
| Flow control agent[4] | 7.6 |
| CYMEL 1161[5] | See Table I |
| Acrylic polyol | See Table I |
| n-Propyl alcohol | 11 |
| Poly (Butyl Acrylate)[6] | 1.3 |
| MULTIFLOW[7] | 1.5 |
| TINUVIN 123[8] | 1.2 |
| DDBSA/DIPA[9] | 3.4 |

[1]Blend of aromatic solvents available from Exxon Chemicals America.
[2]Dibasic ester solvent available from E. I. du Pont de Nemours and Co., CAS# 1119-40-0.
[3]2-(2'-Hydroxy-3',5'-ditert-amylphenyl) benzotriazole UV light stabilizer available from Ciba Specialty Chemicals.
[4]Prepared as generally described in U.S. Pat. No. 4,147,688 Example 11.
[5]Highly monomeric, isobutylated melamine formaldehyde resin available from CYTEC Industries, Inc.
[6]Flow control agent having a Mw of about 6700 n and a Mn of about 2600, made in xylene at 62.5% solids.
[7]Polymer made of 75% by weight 2-ethyl hexyl acrylate, 25% by weight ethyl acrylate with a number average molecular weight of about 7934; 50% solids in xylene. Available from Monsanto Company.
[8]Sterically hindered aminoether light stabilizer available from Ciba Geigy Corporation.
[9]Dodecylbenzene sulfonic acid neutralized with diisopropanolamine, in 40% weight solution in isopropanol.

TABLE I

| Example | Acrylic polyol, total (grams) | CYMEL 1161 |
|---|---|---|
| 1 | Example A, 305 | 46.4 |
| 2 | Example A, 257 | 69.6 |
| 3 | Example A, 228 | 92.8 |
| 4(Comparative) | Example A, 189 | 116.0 |
| 5 | Example B, 272.3 | 69.6 |
| 6(Comparative) | Example C, 264.2 | 69.6 |
| 7 | Example D, 276.4 | 69.6 |
| 8 | Example E, 313.8 | 69.6 |
| 9(Comparative) | Example F, 261 | 69.6 |

All of the above compositions were spray applied in two coats as clear coats over a black solventborne base coat, available from PPG Industries, Inc., as HDCT9939M. The base coat was flashed for five minutes at 200° F. (93.3° C.) before application of the clear coat. The clear coats were given a ten-minutes air flash before baking for thirty minutes at 250° F. (121.1° C.

The following tables summarize the properties measured on these color-plus-clear composite coatings:

TABLE II

| Example # | Solid weight percent, polyol | gloss[1] | DOI[2] | Tukon hardness[3] | Water spot[4] | Acid etch[5] |
|---|---|---|---|---|---|---|
| 1 | 79 | 91.5 | 89 | 13.3 | 2–3 | 3 |
| 2 | 69 | 91.7 | 94 | 12.1 | 2 | 4 |
| 3 | 59 | 91.9 | 95 | 11.4 | 3 | 4 |
| 4* | 49 | 92.4 | 89 | 9.6 | 2–3 | 5 |
| 5* | 69 | 90.6 | 94 | 12.1 | 3 | 5 |

*Asterisk indicates comparative example.
[1]20° Gloss measured with a MacBeth NOVOGLOSS Statistical 20 degree glossmeter. Higher numbers indicate better gloss.
[2]DOI (distinctness of image) measured using a Dorigon II DOI meter from Hunter Lab. Higher numbers indicate better clarity.
[3]Tukon hardness is the Knoop hardness value measured using a Tukon Microhardness Tester Model 300 from Wilson Instruments according to ASTM-D1474-92. Higher numbers indicate greater hardness.
[4]Water spot resistance is measured as follows: Six spots of tap water are placed on a test panel using a pipette. The first spot is one drop of water, the second spot is two drops, the third spot is three drops, etc. The test panel is then placed horizontally in an oven at 140° F. (60° C.) for thirty minutes. After removal from the oven, the test panel is washed with soap and water, rinsed, dried, and visually inspected for rating on a scale of 1 to 6 (1 = no mark on surface; 6 = severe spotting of panel.)
[5]Acid etch resistance is measured as follows: One spot of 0.6 N sulfuric acid solution (pH = 2.0) is placed on a test panel using a pipette. the test panel is then placed horizontally in an oven at 120° F. (48.9° C.) for thirty minutes. After removal from the oven, the test panel is washed with soap and water, rinsed, dried, and visually inspected for rating on a scale of 1 to 6 (1 = on mark on surface; 6 = etching of panel with erosion of film down to electrocoat primer.)

The data in Table II indicate that as the level of polyol increases in the film-forming composition, hardness and acid etch resistance decrease. Note that conventional film-forming compositions (Example 6) exhibit poor acid etch resistance.

TABLE III

| Example | Crack Test[1] | | | | | | |
|---|---|---|---|---|---|---|---|
| | Day 1 | Day 2 | Day 3 | Day 4 | Day 5 | Day 6 | Day 7 |
| 2 | 1 | 1 | 1 | 2 | 2 | 3 | 3 |
| 5 | 1 | 1 | 1 | 1 | 1 | 1 | 1 |
| 7 | 1 | 1 | 1 | 1 | 1 | 1 | 1 |
| 8 | 1 | 4 | 5 | 5 | 5 | 5 | 5 |
| 9* | 2 | 4 | 5 | 5 | 5 | 5 | 5 |

[1]Crack resistance is measured as follows: Four solutions of sulfuric acid are prepared at pH 4, pH 3, pH 2, and 1%. Two drops of each solution are placed on a test panel using a pipette. The test panel is then placed horizontally in an environment at 30 to 60% relative humidity and 60 to 70° F. (15.5 to 23.9° C.) for seven days. The test panel is visually inspected daily for cracking and rated on a scale of 1 to 6 (1 = no crack on surface; 5 = severe cracking; 6 = complete dissolution of coating.)

The data in Table III indicate that crack resistance of the film-forming composition is improved with the use of acrylic polyols formed from acrylate ester monomers having at least four carbon atoms in the alkyl group (Examples 5 and 7). comparative Examples 8 and 9 illustrate the benefits obtained from styrene in the acrylic polyol used in the film-forming composition. The acrylic polyol in the film-forming composition of Example 9 contains methylstyrene in place of styrene, and the acrylic polyol in the film-forming composition of Example 9 contains methyl methacrylate in place of styrene.

We claim:

1. A curable film-forming composition which when cured yields a resultant coating resistant to acid etching, comprising:
    A) a polymer having a weight average molecular weight of about 5000 to about 25,000 as determined by gel permeation chromatography using a polystyrene standard, and having a glass transition temperature of at least about 20° C., said polymer prepared from the following ingredients:
        1) about 10 to about 80 percent by weight, based on the total solid weight of monomers Used to prepare the polymer, of a reaction product of an ethylenically unsaturated acid functional monomer and an epoxy compound containing at least 5 carbon atoms which is not polymerizable with the ethylenically unsaturated acid functional monomer;

2) about 5 to about 50 percent by weight, based on the total solid weight of monomers used to prepare the polymer, of an ethylenically unsaturated, hydroxyalkyl functional monomer;

3) about 15 to about 40 percent by weight, based on the total solid weight of monomers used to prepare the polymer, of a vinyl aromatic monomer; and 4) about 10 to about 60 percent by weight, based on the total solid weight of monomers used to prepare the polymer, of an alkyl ester of acrylic or methacrylic acid containing from 1 to 30 carbon atoms in the alkyl group;

B) an etherified aminoplast crosslinking agent; and

C) an adjuvant curing agent in an amount of up to about 20 percent by weight based on the total weight of resin solids in the film-forming composition.

2. The film-forming composition of claim 1, wherein the polymer is present in the film-forming composition in an amount of about 55 to about 85 percent by weight based on the total weight of resin solids in the film-forming composition.

3. The film-forming composition of claim 1, wherein the aminoplast is present in the film-forming composition in an amount of about 15 to about 45 percent by weight based on the total weight of resin solids in the film-forming composition.

4. The film-forming composition of claim 1, wherein the ethylenically unsaturated, acid functional monomer is selected from the group consisting of acrylic acid, methacrylic acid, itaconic acid, and mixtures thereof.

5. The film-forming composition of claim 1, wherein the epoxy compound has the following structure:

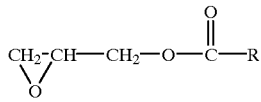

wherein R is a hydrocarbon radical containing from about 4 to about 26 carbon atoms.

6. The film-forming composition of claim 1, wherein the ethylenically unsaturated, hydroxyalkyl functional monomer is selected from the group consisting of hydroxyethyl acrylate, hydroxyethyl methacrylate, hydroxypropyl acrylate, hydroxypropyl methacrylate, 4-hydroxybutyl acrylate, 4-hydroxybutyl methacrylate, and mixtures thereof.

7. The film-forming composition of claim 1 in which the vinyl aromatic monomer is styrene.

8. The film-forming composition of claim 1, wherein the aminoplast is etherified at least in part with isobutyl alcohol.

9. The film-forming composition of claim 1, wherein the alkyl ester of acrylic or methacrylic acid is 2-ethylhexyl methacrylate.

10. The film-forming composition of claim 9, wherein styrene is present in an amount of about 30 to about 40 percent, and the 2-ethylhexyl methacrylate is present in an amount of about 10 to about 20 percent, based on the total solid weight of monomers used to prepare the polymer.

11. The film-forming composition of claim 1, wherein the polymer contains carbamate functionality.

12. The film-forming composition of claim 1, wherein said adjuvant curing agent comprises a tricarbamoyl triazine compound having the formula $C_3N_3(NHCOXR)_3$, wherein X is nitrogen, oxygen, sulfur, phosphorus, or carbon, and R is a lower alkyl group having one to twelve carbon atoms or mixtures of lower alkyl groups.

13. A multi-component composite coating composition comprising a base coat deposited from a pigmented film-forming composition and a transparent top coat applied over the base coat in which the transparent top coat is deposited from a clear film-forming composition comprising:

A) a polymer having a weight average molecular weight of about 5000 to about 15,000 as determined by gel permeation chromatography using a polystyrene standard, and having a glass transition temperature of at least about 20° C., said polymer prepared from the following ingredients:

1) about 10 to about 70 percent by weight, based on the total solid weight of monomers used to prepare the polymer, of a reaction product of an ethylenically unsaturated acid functional monomer and an epoxy compound containing at least 5 carbon atoms which is not polymerizable with the ethylenically unsaturated acid functional monomer;

2) about 5 to about 50 percent by weight, based on the total solid weight of monomers used to prepare the polymer, of an ethylenically unsaturated, hydroxyalkyl functional monomer;

3) about 15 to about 40 percent by weight, based on the total solid weight of monomers used to prepare the polymer, of a vinyl aromatic monomer; and 4) about 10 to about 60 percent by weight, based on the total solid weight of monomers used to prepare the polymer, of an alkyl ester of acrylic or methacrylic acid containing from 1 to 30 carbon atoms in the alkyl group;

B) an etherified aminoplast crosslinking agent, which is etherified with one or more alcohols selected from the group consisting of methanol, n-butyl alcohol, and isobutyl alcohol; and C) an adjuvant curing agent in an amount up to about 20 percent by weight based on the total weight of resin solids in the clear film-forming composition.

14. The multi-component composite coating composition of claim 13, wherein the polymer is present in the clear film-forming composition in an amount of about 55 to about 85 percent by weight based on the total weight of resin solids in the clear film-forming composition.

15. The multi-component composite coating composition of claim 13, wherein the aminoplast is present in the clear film-forming composition in an amount of about 15 to about 45 percent by weight based on the weight of resin solids in the clear film-forming composition.

16. The multi-component composite coating composition of claim 13, wherein the ethylenically unsaturated, acid functional monomer is selected from the group consisting of acrylic acid, methacrylic acid, itaconic acid, an mixtures thereof.

17. The multi-component composite coating composition of claim 13, wherein the epoxy compound has the following structure:

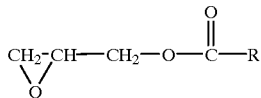

wherein R is a hydrocarbon radical contining from about 4 to about 26 carbon atoms.

18. The multi-component composite coating composition of claim 13, wherein the ethylenically unsaturated, hydroxyalkyl functional monomer is selected from the group consisting of hydroxyethyl acrylate, hydroxyethyl methacrylate, hydroxypropyl acrylate, hydroxypropyl methacrylate, 4-hydroxybutyl acrylate, 4-hydroxybutyl methacrylate, and mixtures thereof.

19. The multi-component composite coating composition of claim 13, in which the vinyl aromatic monomer is styrene.

20. The multi-component composite coating composition of claim 13, wherein the aminoplast is etherified at least in part with isobutyl alcohol.

21. The multi-component composite coating composition of claim 13, wherein the alkyl ester of acrylic or methacrylic is 2-ethylhexyl methacrylate.

22. The multi-component composite coating composition of claim 21, wherein the styrene is present in an amount of about 30 to about 40 percent, and the 2-ethylhexyl methacrylate is present in an amount of about 10 to about 20 percent, based on the total solid weight of monomers used to prepare the polymer.

23. The multi-component composite coating composition of claim 13, wherein the polymer contains carbamate functionality.

24. The multi-component composite coating composition of claim 13, wherein said adjuvant curing agent comprises a tricarbamoyl triazine compound having the formula $C_3N_3(NHCOXR)_3$, wherein X is nitrogen, oxygen, sulfur, phosphorus, or carbon, and R is a lower alkyl group having one to twelve carbon atoms or mixtures of lower alkyl groups.

* * * * *